Aug. 19, 1952     S. K. WELLMAN     2,607,246
METHOD OF SHAPING BIMETALLIC ARTICLES

Filed Sept. 21, 1944     5 Sheets-Sheet 1

INVENTOR:
Samuel K. Wellman
BY
C. Thomas Cox
ATTORNEY

Aug. 19, 1952 S. K. WELLMAN 2,607,246
METHOD OF SHAPING BIMETALLIC ARTICLES
Filed Sept. 21, 1944 5 Sheets-Sheet 2

INVENTOR:
Samuel K. Wellman
BY
C. Thomas Cox
ATTORNEY

Aug. 19, 1952     S. K. WELLMAN     2,607,246
METHOD OF SHAPING BIMETALLIC ARTICLES

Filed Sept. 21, 1944     5 Sheets-Sheet 3

INVENTOR:
Samuel K. Wellman
BY
C. Thomas Cox
ATTORNEY.

Aug. 19, 1952   S. K. WELLMAN   2,607,246
METHOD OF SHAPING BIMETALLIC ARTICLES
Filed Sept. 21, 1944   5 Sheets-Sheet 5
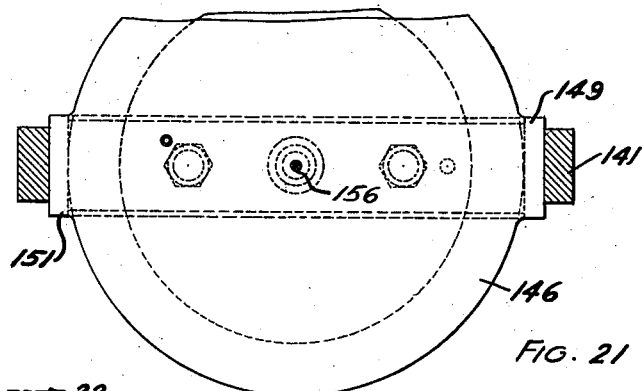
FIG. 21
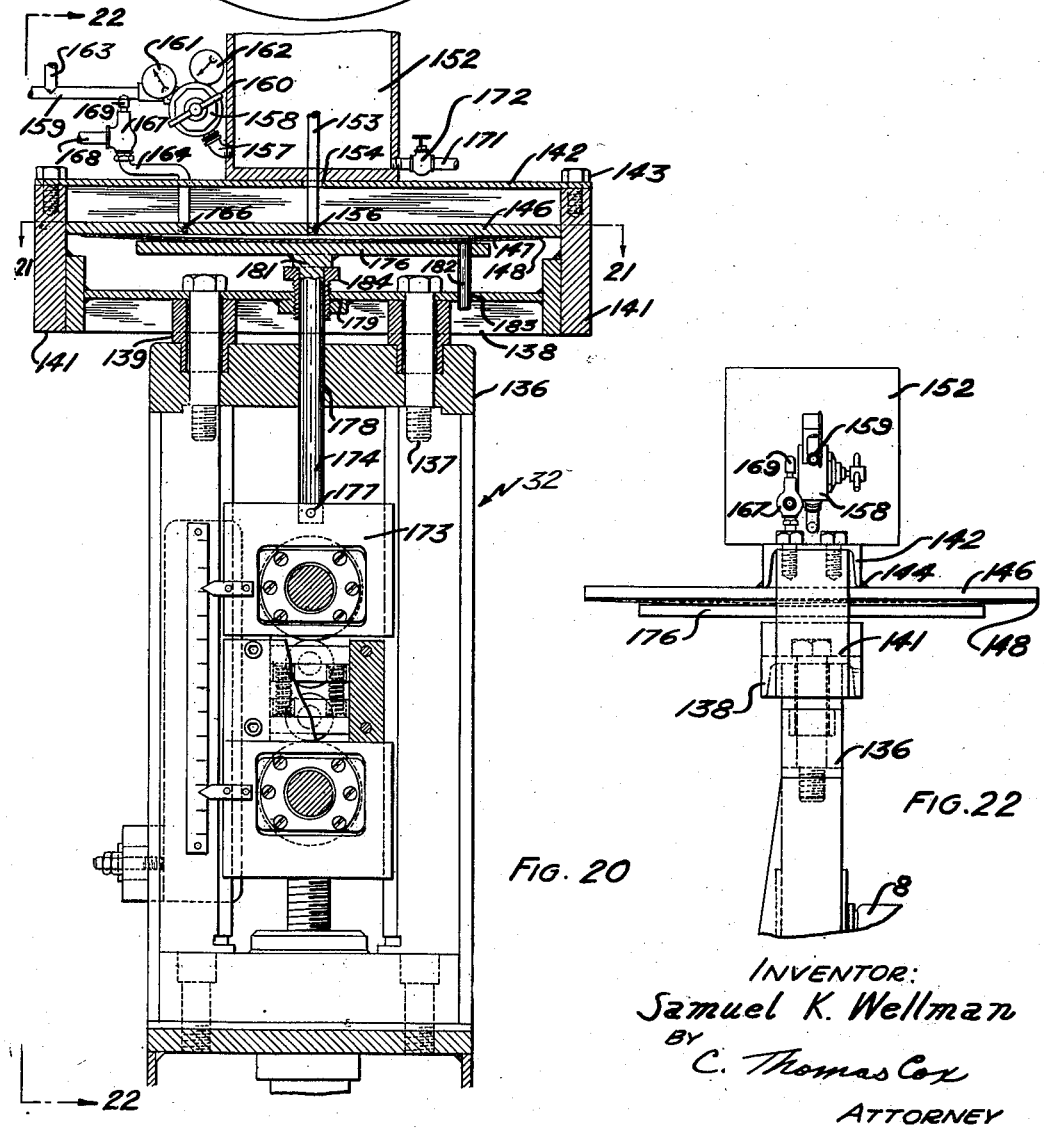
FIG. 20
FIG. 22
INVENTOR:
Samuel K. Wellman
BY C. Thomas Cox
ATTORNEY Patented Aug. 19, 1952

2,607,246

UNITED STATES PATENT OFFICE 2,607,246

METHOD OF SHAPING BIMETALLIC ARTICLES

Samuel K. Wellman, Cleveland Heights, Ohio, assignor to The S. K. Wellman Company, Cleveland, Ohio, a corporation of Ohio Application September 21, 1944, Serial No. 555,116

2 Claims. (Cl. 80—60)

This invention relates to a method for imparting a curved shape to bimetallic articles of the type having a sintered metal facing layer integrally bonded to the face of a reinforcing member or backing of solid metal, such as steel or copper.

Bimetallic articles of the type referred to are produced by pressing or briquetting metal powder of suitable composition and containing minor amounts of nonmetallic ingredients, such as graphite, and then heating the briquette so formed to a sintering temperature. Since the sintered metal is rather porous and of low tensile strength, it is desirable to provide a reinforcing member or backing of stronger metal, and this is accomplished by conducting the heating or sintering step with the briquette held against a properly prepared surface of a backing member. The heat of the sintering step causes the pressed powder to sinter together and to integrally bond to the backing member thus forming a bimetallic article having a sintered metal facing layer integrally bonded to the face of a solid metal backing member. The term "sintered metal facing" is used to refer to facings produced by pressing and sintering a predominately metallic mixture of metallic and non-metallic powders.

Bimetallic articles of this type have found extensive use as rubbing surfaces in heavy-duty applications, as for example, friction members for clutches and brakes and bearings for shafts. A typical mixture of powders comprises:

| | Parts by weight |
|---|---|
| Copper | 67.26 |
| Sn | 5.31 |
| Pb | 8.72 |
| Fe | 7.20 |
| C | 7.08 |
| SiO$_2$ | 4.42 |

This mixture may be briquetted at a pressure of about 11 tons per square inch and assembled on a prepared steel backing member and heated to a temperature of about 1450° F. under a pressure of about 100 pounds per square inch. The steel backing member may be of S. A. E. 1030 composition and must be suitably prepared before the heating operation. One method of preparation is disclosed in Swartz Patent No. Re. 22,282.

The necessity of pressing the powder to form the briquette and of pressing the briquette against the backing during the sintering and bonding step limits the process, as a practical matter, to the production of articles of flat configuration since it is difficult to press the powder to a curved shape and avoid uneven pressure and density. However, it is frequently desirable to produce bimetallic articles of curved form so that they can be used for shaft bearings or for brake shoes adapted to engage a cylindrical or conical surface. Thus, it is customary to shape or bend a flat bimetallic strip to curved shape by use of a bending press and suitable dies. If the flat bimetallic strip is to be bent so that the sintered facing will be disposed on the inside of the curved strip, there is relatively little difficulty in accomplishing this in a press using a suitably shaped die. However, attempts to use a press and die to bend the bimetallic article so that the sintered facing is disposed on the outside of the curve or on the convex face of the backing member for use in an internal expanding brake, for example, have not been very successful. The sintered facing of an article so bent is deeply cracked, due probably to the low tensile strength of the sintered layer.

Other and more satisfactory methods for bending such articles to a shape having the sintered facing disposed on the outside have been developed and one such method is described in Wellman Patent No. 2,289,311, issued July 7, 1942. According to this patent, the flat bimetallic article is provided with a thin sheet metal reinforcing member which is integrally bonded to the sintered facing forming in effect a sandwich with the sintered material disposed between the thin sheet metal facing and the thicker solid metal backing member. When such a sandwich article is bent in a press, the thin sheet metal facing stretches and holds the sintered layer together, minimizing the cracking of the sintered layer. After being bent, the thin metal facing is stripped or peeled off leaving a sintered face that is substantially free from cracks. This process, of course, is rather time consuming and expensive.

An improved process for bending such bimetallic articles to curved formation is disclosed in copending applications S. N. 507,429, filed October 23, 1943, of Francis J. Lowey, now Patent No. 2,446,892, granted August 10, 1948, and S. N. 520,162, filed January 29, 1944, of Charles H. Tower and Francis J. Lowey, now Patent No. 2,446,891, granted August 10, 1948. These applications teach that the bending of a flat bimetallic article may be successfully accomplished by controlled directional working of the sintered metal facing. Preferably, this is accomplished by passing the bimetallic article between a pair of opposed pressure rolls in order to compress and elongate the sintered facing. This elongation of the facing results in controlled bending of the bimetallic article.

The bending of the bimetallic blank is apparently due to the fact that the sintered facing is enlongated, while the less plastic backing member of steel is not elongated to any appreciable extent. This elongation of one layer only of a bimetallic article in which the two layers are firmly united obviously results in bending of the article. Thus, in a bimetallic blank having a sintered facing composed predominantly of copper bonded to a solid steel backing member, the progressive mechanical working will result in considerable elongation of the sintered facing without elongating the backing and a consequent bending of the blank to curved shape with the sintered facing disposed on the outer or convex side of the backing.

The terms plastic and plasticity may be used to indicate the flowable or deformable properties of the sintered material which permit the elongation and cause the bending. While sintered metallic material is generally of low tensile strength in comparison with solid metal, such as steel, it does possess the property of being plastic or flowable to a rather high degree. In this respect, it may be said that it is of high ductility in that it is capable of being deformed and hammered out.

The method of bending may be described as being accomplished by applying pressure to laterally extending areas of the article successively and progressively along the length of the article, the amount of pressure being controlled to elongate the more plastic facing to a sufficiently greater extent than the less plastic backing member to bend the article to the predetermined curvature.

This method is applicable to the controlled bending of any bimetallic blank which has layers of different plasticity, but it is primarily applicable to bimetallic articles having a sintered metal facing bonded to a solid metal backing member and in which the facing is of greater plasticity than the backing, as is the usual case. It may be practiced on bimetallic articles in which both layers are of solid metal or on articles in which a sintered metal facing of relatively low plasticity, such as an iron-base mixture, is bonded to a backing member of higher plasticity, such as copper. In all of these cases, controlled directional working of the bimetallic article will cause it to assume a curved shape with the more plastic layer disposed on the outer or convex side of the backing. In the case where a sintered iron-base mix is secured to a backing member of copper, the bending will be in reverse direction and the sintered layer will be disposed on the inner or concave side of the backing. The bending of these latter articles by this method is not of major importance since it is relatively easy to form such shapes in a bending press.

This invention is, therefore, primarily directed to the accurate bending to shape of a bimetallic blank of the type having a sintered metal facing bonded to a less plastic backing member of solid metal. By the term "sintered metal," I intend to include not only layers made from metal powders by means of pressing and sintering, but also layers made by spraying metal onto a backing member and then sintering the same to increase the strength of the article.

The copending applications referred to generally disclose the controlled bending of bimetallic blanks, but they contemplate the use of pressure rolls which are rigidly held in the desired position, so as to have a constant spacing apart of the rolls and a constant applied pressure to uniform articles. While this method achieves very satisfactory results, some difficulties have arisen with bimetallic articles in which the facing is of non-uniform thickness or density. It is apparent that with the rolls spaced a constant distance apart any longitudinal variation in thickness, density, or plasticity of the blank will result in variations in the degree of bending. My invention comprises the discovery that the effect of such variations may be avoided if the rolls are urged toward one another under a constant and predetermined pressure and the spacing apart of the rolls is merely controlled by the thickness and density of the blank.

The underlying theory of the operation is not too clearly understood but, as indicated above, I believe that the progressive mechanical working of successive lateral areas of the sintered facing of the bimetallic blank results in controlled and progressive elongation of the areas and the resultant bending of the blank. If the blank is longitudinally of varying plasticity due to variations in density and/or thickness, the use of constant pressure, according to my invention, apparently serves to greatly reduce or eliminate the effect of such variations. It appears that this constant pressure serves to insure that successive lateral areas are subjected to the same degree or amount of mechanical working and thus elongate longitudinally to the same degree.

It is an object of the invention to provide a new and improved method by which bimetallic articles having layers of different plasticity may be accurately and rapidly bent, curved, or otherwise formed to the desired shape.

It is a further object of the invention to provide a new and improved method by which bimetallic articles of the type having a sintered metal facing bonded to a less plastic backing member of solid metal may be formed to a curved shape of predetermined configuration without injuring or cracking the facing and with the sintered facing disposed on the outer or convex surface of the backing member.

Other and further objects and advantages of my invention will be apparent from the following description and the accompanying drawings, in which:

Fig. 20 is a side elevation corresponding to Fig. 17 but showing a modified form of pressure-applying apparatus;

Fig. 21 is a horizontal section on line 21—21 of Fig. 20; and

Fig. 22 is a vertical elevation on line 22—22 of the left side of the apparatus of Fig. 20.

Figure 1:
Fig. 1 is a plan view, on a reduced scale, of a flat bimetallic blank which is to be bent to cylindrical shape.
Figure 2:
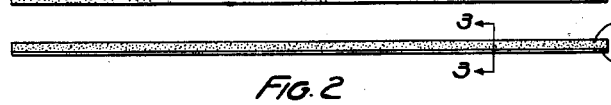
Fig. 2 is a side elevation of the blank of Fig. 1.
Figure 3:
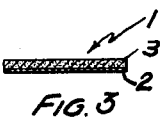
Fig. 3 is a vertical section on line 3—3 of Fig. 2.
Figure 4:
Fig. 4 is a side elevation of the blank of Figs. 1 to 3 after it has been formed to shape in accordance with the teachings of my invention.
Figure 14:
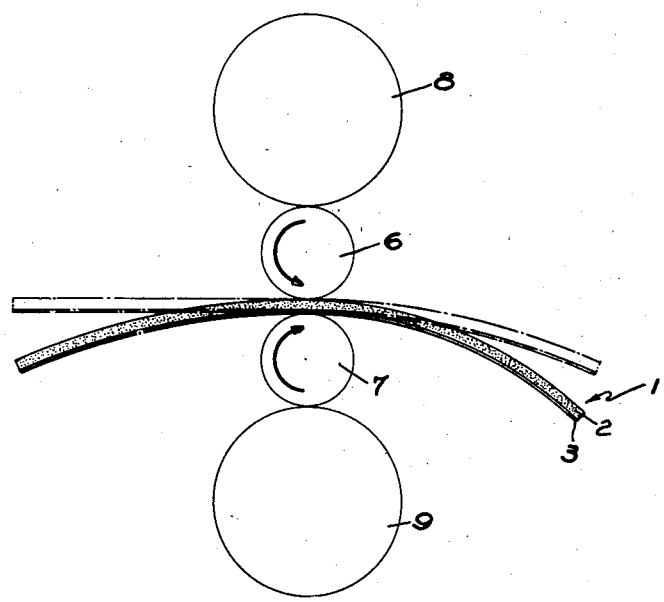
Fig. 14 is a diagrammatical showing of apparatus suitable for shaping the blank of Figs. 1 to 3.

By my invention I propose to take the flat blank 1 shown in Figs. 1 to 3 and bend it to a curved formation as shown in Fig. 4 with the sintered facing 3 disposed on the outer or convex face of the steel backing member 2. This I accomplish by passing the bimetallic blank 1 between a pair of opposed pressure rolls. Thus, referring to Fig. 14, which diagrammatically illustrates the bending operation, the bimetallic blank 1 is shown in position between a pair of opposed pressure rolls 6 and 7. In this figure, the blank 1 is shown as traveling from the left to the right of the figure. The dotted lines show the position of the blank at its mid-point in its first pass between the rolls and with the right side of the blank partially curved. In its solid-line position, the partially curved blank is shown in its second pass between the rolls and the right side of the blank is shown as having achieved the final and desired curvature. In this figure, the pressure rolls 6 and 7 are shown provided with backing rolls 8 and 9 which serve to hold the pressure rolls 6 and 7 in place and to rotate them.

As is disclosed in the said copending applications above referred to, the degree of curvature achieved will be dependent upon the relative density, thickness, and plasticity of the facing 2 and the backing 3, the relative thickness of these two parts and the speed, diameter, and pressure applied by the rolls. The progressive mechanical working achieved by the rolls 6 and 7 causes the less dense facing layer to be compressed and elongated resulting in curvature of the blank. While there are many factors affecting the bending operation, the major item controlling the extent of bending is the extent of mechanical working by the rolls. This in turn is dependent on the density and thickness of the facing and the amount of pressure applied to the rolls. For any given bimetallic article, the degree of bending is proportional to the degree of working and thus bending to a smaller radius merely requires the use of a greater pressure on the pressure rolls to obtain a greater elongation of the sintered facing. This mechanical working obviously results in a slight decrease in thickness of the facing layer, but this can easily be accommodated for by using an initially thicker article than that desired after bending.

Figure 5:
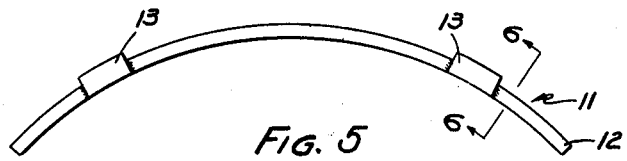
Fig. 5 is a side elevation of a jig which may be used to form the blank of Fig. 1.
Figure 6:
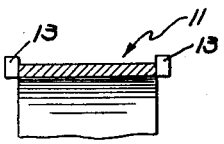
Fig. 6 is a vertical section on line 6—6 of Fig. 5.
Figure 15:
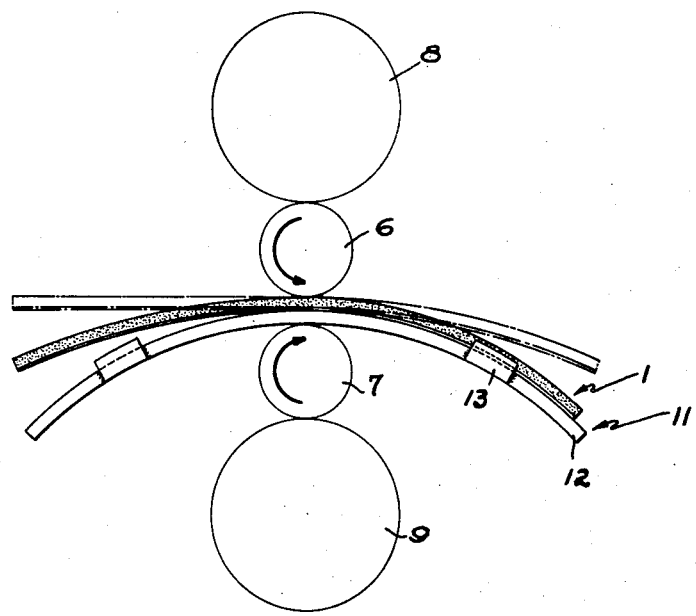
Fig. 15 is a diagrammatical illustration similar to that shown in Fig. 14, but illustrating the use of the jig of Figs. 5 and 6.

Fig. 15 illustrates the operation of the pressure rolls 6 and 7 when used in conjunction with a jig 11. The operation is essentially the same as that shown in Fig. 14 but the jig 11 serves to limit and control the bending of the bimetallic blank 1. This jig 11 is illustrated in Figs. 5 and 6 and is shown as comprising a strong, solid metal cylindrical member 12, preferably of steel, to which are welded tabs or lugs 13 which cooperate with the member 12 to define a partial channel for reception of the bimetallic blank. The lugs can be omitted or could be continuous, if desired, to form a complete channel. Obviously, the cylindrical member 12 has an outer surface whose radius of curvature is substantially equal to the inside radius of the desired curvature of the backing member 2 of the bimetallic blank 1.

Figure 8:
Fig. 8 is a side elevation of the blank of Fig. 7.
Figure 9:
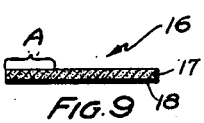
Fig. 9 is a vertical section on line 9—9 of Fig. 8.

The invention is applicable to the formation of conical shapes as well as the cylindrical shape of Fig. 4. Thus, the arcuate flat segment 16 of Figs. 7, 8, and 9 having the steel backing 18 and sintered facing 17 integrally bonded thereto may be formed to the conical shape shown in Figs. 10 and 11 by passing the same between the pressure rolls 6 and 7. The conical shape is achieved by adjusting the pressure-applying means of the rolls so that the pressure applied by the rolls increases in amount across the segment, the area generally included by the bracket A of Figs. 7, 9, and 11 receiving the greater pressure. This greater pressure results in greater working of that portion of the facing and consequent greater degree of bending.

Figure 7:
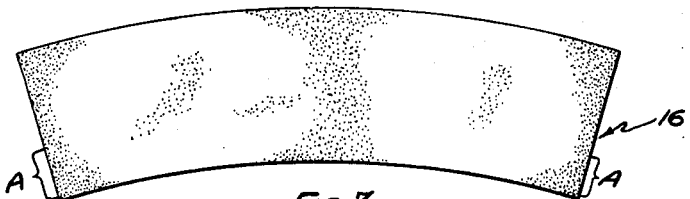
Fig. 7 is a plan view, on a reduced scale, of an arcuate, flat bimetallic blank suitable for forming articles of conical configuration.
Figure 12:
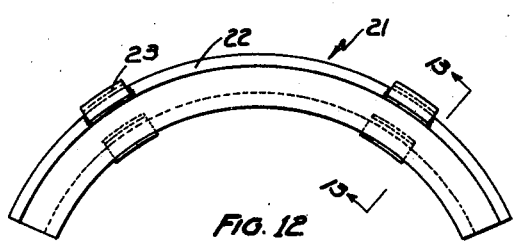
Fig. 12 is a side elevation of a suitable jig which may be used in shaping the blank of Figs. 7 to 9.
Figure 13:
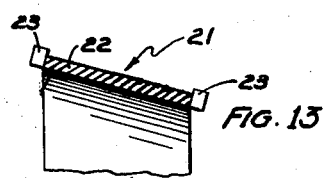
Fig. 13 is a vertical section on line 13—13 of Fig. 12.

Figs. 12 and 13 illustrate a conical jig 21 corresponding to the cylindrical jig 11 of Figs. 5 and 6 but for use with the arcuate segment 16 of Fig. 7. This jig 21 has a conical steel member 22 to which are welded spaced side lugs 23 to define a partial channel for reception of the blank 16. Thus, if this jig 21 and the bimetallic blank 16 are passed between the pressure rolls 6 and 7 as shown in Fig. 15, the blank will be formed to a conical shape if the rolls are urged toward each other with a pressure that increases along the length of the rolls. This will be further dealt with below.

Figures 16, 17, 18:
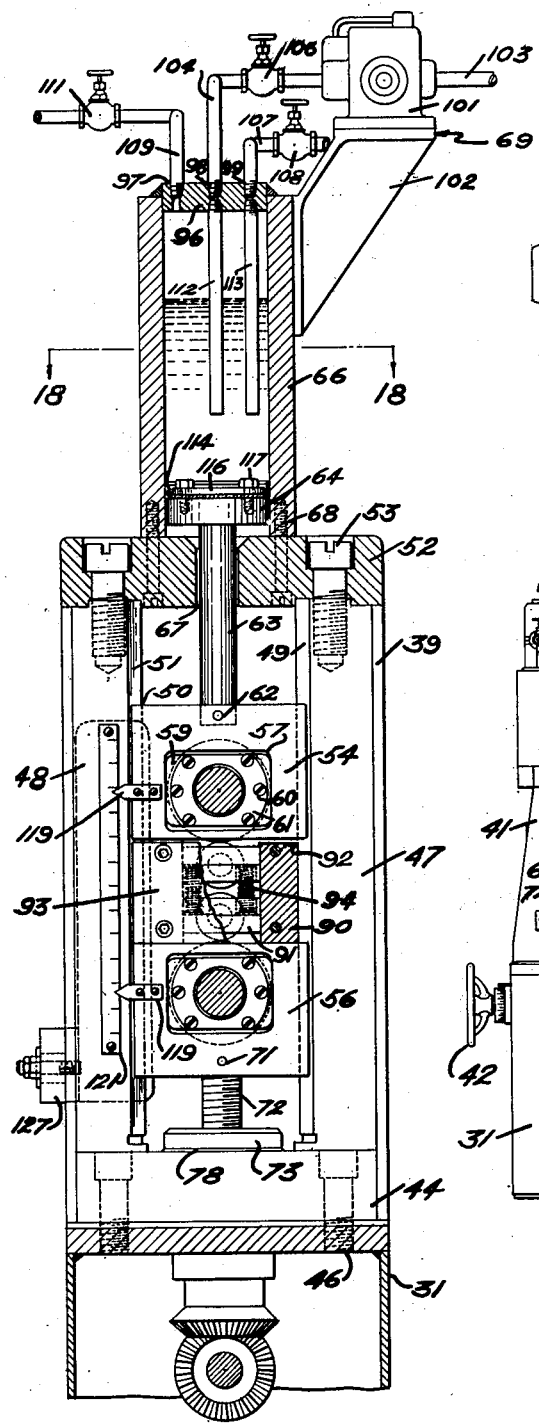
Fig. 16 is a front elevation of suitable apparatus for carrying out the invention.
Fig. 17 is a vertical section on line 17—17 of Fig. 16 but on an enlarged scale.
Fig. 18 is a horizontal section on line 18—18 of Fig. 17.

Referring now to Figs. 16 through 19, I have illustrated one suitable form of apparatus for achieving the above desired results. Fig. 16 generally shows the apparatus as comprising a base 31 on which is located the roll unit generally indicated at 32. Disposed within the base 31 is a motor 33 which drives a gear reduction unit 34 through a belt 36. The gear reduction unit 34 is coupled to the backing and drive rolls 8 and 9 of the roll unit 32 by means of the power-driven telescoping shafts 37 and 38 provided with universal joints to permit vertical adjustment of these rolls. The roll unit 32 comprises side frames 39 and 41 which support the bearing blocks for the backing rolls 8 and 9 and the pressure rolls 6 and 7. All of the rolls are mounted for vertical movement, the lower rolls being adjusted by means of the handwheel 42 and the upper rolls by means of a pressure-applying system 43, all as will be described in greater detail hereinafter.

Figure 19:
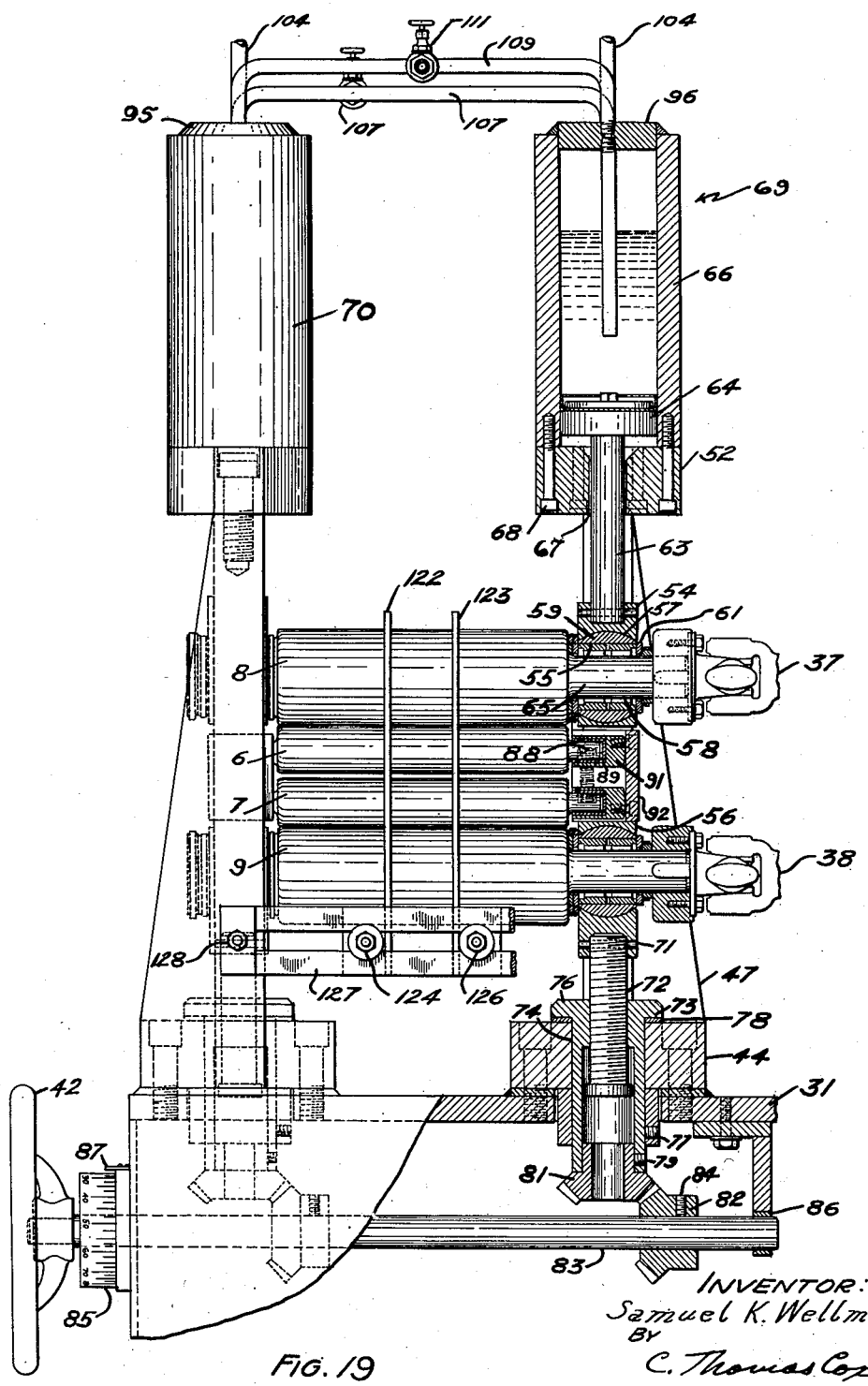
Fig. 19 is a front elevation of the apparatus of Fig. 17 with parts broken away and parts in section.

As shown in Fig. 17, the side frame 39 comprises a lower base member 44 which is bolted at 46 to the base 31. Extending upwardly from the base member 44 are spaced vertical side members 47 and 48 provided on their opposing faces with vertical shoulders 49 and 51 which cooperate to form a guide or slideway 50. A thick plate 52 spans the upper ends of the side members 47 and 48 and is bolted thereto at 53. Disposed between the side members 47 and 48 are two bearing blocks 54 and 56, each of which is provided with channels for engagement with the shoulders 49 and 51 of the guide 50 so that the blocks may be moved vertically. The upper block 54 is provided with an opening 57 for reception of the holder for the bearing for the roll 8. As shown in Fig. 19, this opening 57 has upper and lower boundaries of cylindrical configuration. A bearing holder 59 having cylindrical upper and lower faces is mounted in the opening 57. A needle bearing 58 is mounted in an opening 55 in the holder 59. A cover plate 61 secured to the holder 59 by screws 60 serves to retain the bearing in place. The bearing 58 is provided with the usual packing and rotatably receives the neck or reduced portion 65 of the roll 8. By this means, the end of the roll 8 is mounted for free rotation in the bearing block 54. The cylindrical mounting of the holder 59 permits tilting of the roll and the bearing with respect to the bearing block 54. The lower bearing block 56 is of the same construction as the upper and need not be described.

The upper bearing block 54 is secured by a pin 62 to a piston rod 63 which is integral with a piston 64 disposed in the pressure cylinder 66, the piston rod 63 extending through an opening 67 in the top plate 52 of the frame 39. The cylinder 66 is bolted at 68 to the top plate 52 and is provided at its upper end with fluid pressure supply means generally indicated at 69 and which will be described hereinafter.

The lower bearing block 56 is secured by a pin 71 to a threaded shaft 72 which threadably engages a rotatable nut 73 mounted in the base 44. As shown in Fig. 19, this nut 73 is rotatably received in an opening 74 in the base 44 and is held against vertical movement with respect thereto by means of the upper flange 76 and a lower set collar 77, a thrust washer 78 being disposed between the flange 76 and the top of the base 44. Secured to the lower end of the nut 73 by means of a setscrew 79 is a bevel gear 81 meshing with a second bevel gear 82 secured to the shaft 83 by means of a setscrew 84. This shaft 83 is suitably mounted in bearings 86 in the base 31 and is provided at its outer end with a handwheel 42. A graduated collar 85 is secured to the shaft 83 adjacent the handwheel 42 for cooperation with a pointer 87 secured to the base 31 for indicating the extent of rotation of the shaft 83 and the vertical position of the roll 9.

I have described specifically the side frame 39 of the roll unit 43 and the mounting therein of the backing rolls 8 and 9. It is apparent from Fig. 19 that the other side frame 41 is similarly constructed and has a pressure cylinder 70 corresponding to cylinder 66 and that it need not be described in detail. From the above, it is evident that the upper backing roll 8 is moved vertically by means of the piston rods 63 and that the lower backing roll 9 is moved vertically by turning the handwheel 42. The upper backing roll 8 is independently mounted in that either end may be adjusted. The lower backing roll 9 is not so mounted in that rotation of the handwheel 42 causes the bearing blocks at each end of the roll to move vertically at the same rate. However, the lower roll may be independently adjusted by disconnecting the coupling of one bearing block to the shaft 83 as by loosening a setscrew 84.

Disposed between the rolls 8 and 9 are the pressure rolls 6 and 7. Referring now to Fig. 19, each end of each pressure roll is provided with a reduced portion or neck 88 for mounting in a bearing 89 carried by a bearing holder 91. These bearing holders 91 comprise flat blocks slidably received in a large bearing block 92 which is mounted for movement between the shoulders 49 and 51 of the guide 50. The bearing block 92 comprises flat vertical side plates 90, held in spaced relation by the plates 93, which form short vertical guides for the bearing holders 91.

A pair of springs 94 is disposed between the bearing holders 91 of the rolls 6 and 7 to urge the rolls apart and into engagement with the respective backing rolls. By this construction, the bearing holders 91 of the rolls 6 and 7 are slidable vertically in the bearing block 92 which in turn is slidable vertically in the guide 50.

The pressure supply unit 69 for the upper roll 8 will now be described. Referring now to Figs. 17 and 19, it will be seen that the upper end of the cylinders 66 and 70 are closed by means of cylinder heads 95 and 96 welded thereto. Each head is provided with threaded openings 97, 98, and 99 for reception of fluid supply and discharge pipes. A hydraulic pump 101 is mounted on a support 102 secured to the upper end of the cylinder 66. This pump has a supply pipe 103 connected between the pump and a suitable reservoir of liquid such as oil. A bifurcated exit or pressure pipe 104 extends from the pump 101 and has its bifurcated ends threaded into the openings 98 of the cylinder heads 95 and 96, a valve 106 being disposed in this line adjacent the pump. A bifurcated pipe 107 has its bifurcated ends threaded into the openings 99 of the cylinder heads 95 and 96 and communicates through the valve 108 with a place of discharge which may be the same reservoir to which the inlet 103 of the pump is connected. Another bifurcated pipe 109 is threaded into the openings 97 of the cylinder heads 95 and 96 and communicates through a valve 111 with a source of air or other gas under pressure. Disposed on the lower side of each cylinder head 95 and 96 are pipes 112 and 113 which thread into the threaded openings 98 and 99, respectively, and serve to insure that the inlet and outlet of the liquid in the cylinders 66 and 70 will be below the liquid level.

It is apparent from this description and from Figs. 16 and 19 that the pressure supply to the cylinder 66 on the right side of Fig. 19 is interconnected with that of the pressure supply of the cylinder 70 on the other side of the machine so that the same pressure is applied to both pistons. Thus, from the respective valves 106, 108, and 111, the pipes 104, 107, and 109 are bifurcated, and connect both cylinders with the same valves.

Each cylinder 66, 70 has a piston 64 which is provided on its upper side with a cup-shaped gasket 114 secured thereto by means of the plate 116 and bolts 117 and on its lower side with a rod 63 for attachment to the adjacent bearing block of the roll 8.

The bearing blocks 54 and 56 on each end of the machine are provided with pointers 119, see Fig. 17, for cooperation with a scale 121 secured to the side members 48 to indicate the degree of spacing apart of the rolls. These together with the graduated collar 87 secured to the shaft 83 of the handwheel 42 serve as indicators of the position of the rolls.

Disposed at the front of the roll unit 32 are vertical plates 122 and 123, see Fig. 19, which serve not only as entering guides for insuring that a blank is fed into the rolls at right angles thereto, but also as protecting guards for the operator. These plates are adjustably bolted at 124 and 126 to a slotted cross bar 127 bolted at 128 to the side members 39 and 41 of the unit. The slot in the cross bar 127 serves to permit adjustment of the spacing apart of the plates 122 and 123 to accommodate various widths of articles to be rolled.

The operation of the device will now be described. As an example, it will be assumed that it is desired to bend a bimetallic article having a width of about 3¼", a facing thickness of about 1/16", a backing thickness of about 1/8", and a length of about 12" to a cylindrical curvature about 12" in diameter. The operator will adjust the lower backing roll 9 by means of the handwheel 42 so that it is in an intermediate position substantially as shown in Fig. 19. He will then adjust the pressure applied to the upper roll so as to attain the required amount of mechanical working of the article on passage through the rolls. In the specific example illustrated using pressure rolls 6 and 7 having a diameter of about 2" and cylinders 66 and 70 having an inside diameter of 4", he will adjust the pressure in the cylinders, in a manner further described below, so that it is in the neighborhood of 700 pounds per square inch in the cylinders. He will then start the motor 33 to rotate the rolls and will pass the blank between the pressure rolls 6 and 7. For the article in the example, the peripheral speed of the rolls should be about 12 feet per minute. Although it is possible to achieve the required bending in one pass through the rolls by using a high pressure, it is preferred that two or three passes will be required, much in the manner illustrated in Fig. 14. The indicated pressure is such as to require several passes. The use of several passes result in gradual bending and in the complete elimination of cracking and chipping of the sintered facing.

The manner in which the controlled pressure is applied is one important feature of my invention. It is apparent from the above description of the apparatus that the cylinders 66 and 70 are connected to sources of not only a gas, such as air, under pressure, but also a liquid, such as oil, under pressure. The purpose of the liquid is to provide the pressure and to control the degree of cushioning effect obtained by the air. This may be made clearer by the following description of the procedure to be followed by the operator.

With each cylinder containing oil to the level shown in Fig. 17 and with all valves closed, the operator will open air-supply valve 111 to admit air under pressure to the cylinder 66. The pressure of this air will be relatively low or about 90 pounds per square inch and is readily obtained. He will then close the air supply valve 111, open the oil supply valve 106 and start the pump 101 and allow it to continue pumping until a pressure of about 700 pounds per square inch is achieved in the cylinder 66. At this time, he will close the oil supply valve 106 and stop the pump. The air in the cylinder 66 will be compressed under a pressure of 700 pounds per square inch and will exert this downward pressure on the piston 64 and through the piston rod 63 to the upper backing roll 8. As a result of this, the pressure on the upper pressure roll 6 will be relatively constant regardless of the thickness of the blank and spacing apart of the pressure rolls 6 and 7. The presence of the air in the cylinders gives a cushioning effect and permits the pressure rolls to adjust for any differences in thickness and density of the article.

The provision for the supply of oil under pressure is advantageous in that it permits the cushioning effect to be varied. By using a lower oil level, more air will be trapped in the cylinder and the cushioning of the upper roll will be greater. By using a higher oil level, less air will be present and the cushioning effect on the roll will be less and a stiffer action obtained. The oil is also advantageous in that it is mechanically more feasible to obtain high oil pressures than it is to obtain high air pressures.

The use of gas under pressure through the valve 111 and pipe 109 is necessary only to permit an adjustment of the level of the liquid in the cylinders 66 and 67. That is, pressure is necessary to force the liquid up the exhaust pipe 113 and out through the valve 108 to the reservoir. If a discharge pump or siphon were provided to permit removal of the oil through the pipe 113, it would be sufficient to merely have the valve 111 communicate with atmospheric air.

While I have illustrated the use of an intermittently operated liquid pump 101 and air supply pipe 109 to attain constant pressure in the cylinders 66 and 70, it is apparent that this constant pressure may be achieved in other ways. For example, a continuously operated liquid pump having a constant pressure discharge could be utilized. As a further modification, an adjustable compression spring could be substituted for each cylinder and its gas and oil supply.

Obviously, however, gas pressure alone could be employed. Thus, in Figs. 20, 21, and 22, I have illustrated a modified form in which the pressure is obtained solely by means of gas pressure. This has some advantages in that the apparatus is simpler and oil leakages are no problem. To avoid the necessity for a source of high pressure air and to avoid leakages, the device comprises an air-operated diaphragm of large area.

Referring now to Fig. 20, I have illustrated the upper portion of the roll unit 32 as being of the same construction as the unit shown in Figs. 16 through 19; however, the upper plate 52 and a pressure unit 69 of the embodiment of Fig. 17 have been substituted by the upper plate 136 which is likewise bolted at 137 to the roll unit 32. The plate 136 carries on its upper side and secured thereto by means of the bolts 137, a channel member 138. Sleeves 139 serve to space the channel 138 above the plate 136. Each end of the channel 138 has welded thereto a vertical flat bar 141. An upper channel 142 joins the upper ends of the bars 141 and is bolted thereto at 143. Disposed on the lower side of the upper channel 142 and welded thereto at 144 is a circular backing plate 146. This backing plate has a circular diaphragm 147 disposed on the lower side thereof and welded thereto at its peripheral margin 148. As is shown in Fig. 21, the backing plate 146 is provided with two oppositely disposed ears 149 and 151 for engagement with the vertical members 141 to position it.

Mounted centrally of the upper channel 142 and on the upper side thereof is a closed air chamber 152 which serves as a dirt and water trap and as an accumulator. A pipe 153 extends from the air chamber through an opening 154 in the upper channel into a threaded opening 156 in the center of the backing plate 146. The chamber 152 is further connected at 157 through a pressure-regulating valve 158 with a pipe 159 which is connected to a suitable source of air under pressure. The pressure regulator 158 is of usual type and has a handle 160 for adjusting the pressure on its discharge side, a gauge 161 for indicating the line pressure in pipe 159 and a pressure gauge 162 for indicating the reduced pressure present in the chamber 152. The air supply pipe 159 has a branch pipe 163 which leads to a corresponding air pressure regulating valve for the other side member of the roll unit. A pressure relief valve 167, having an exhaust opening 168 and an adjustment nut 169, is connected to the diaphragm by a pipe 164 threaded at 166 into the backing plate 146.

A drain pipe 171 and valve 172 are provided at the lower end of the chamber 152 to permit removal of condensed water and dirt from the chamber.

It will be seen that the described structure is such that the admission of air through the pipe 153 between the backing plate 146 and the diaphragm 147 causes the latter to bulge downwardly under relatively great pressure due to the large area of the same. This downward pressure is imparted to the bearing block 173 by means of a rod 174 having a pressure plate 176 at the upper end thereof. The rod 174 is pinned at its lower end at 177 to the upper end of the bearing block 173. The rod 174 extends upwardly from the bearing block 173 first through an opening 178 in the plate 136 and then through an opening 179 in the lower channel member 138. The upper end of the rod 174 is provided with a head 181 to which is welded the pressure plate 176. This pressure plate 176 is of rather large diameter and is disposed so as to receive the thrust from the diaphragm 147. The pressure plate 176 is also provided with a downwardly extending pin 182 which is slidably received in an opening 183 in the lower channel 138 to restrain the plate 176 from rotation.

The opening 179 in the channel 138 through which the rod 174 extends has a threaded bushing 184. This bushing 184 engages the lower side of the head 181 to limit downward movement of the pressure plate 176. The amount of vertical movement of the pressure plate 176 is obviously adjusted by turning the threaded bushing 184.

In the operation of the device the operator will turn the handle 160 of pressure-regulating valve 158 to achieve the desired pressure in chamber 152 and between the backing plate 146 and the diaphragm 147. This pressure will serve to urge the diaphragm 147 downwardly, and it will in turn force down the upper roll 8 through the medium of the pressure plate 176 and pressure rod 174. Due to the large area of the diaphragm, the downward pressure achieved will be of relatively great magnitude, although the pressure in the chamber 152 may be low. Thus, with an air pressure of about 50 pounds per square inch in the chamber 152 and with a pressure plate 176 of about 18" in diameter, a total downward pressure of about 700 pounds is achieved. This is less than the theoretical pressure of 1270 pounds because of friction losses and the fact that the whole area of the pressure plate 176 does not receive pressure.

For bending the specific article used in the illustration with regard to the apparatus shown in Figs. 16 to 19, an air pressure 45 pounds per square inch has been used in the chamber 152.

Figure 10:
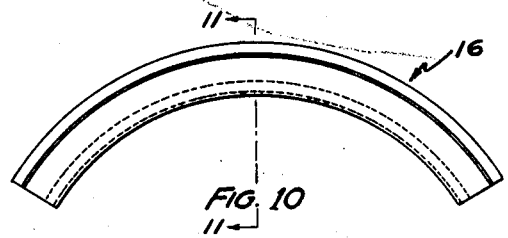
Fig. 10 is a side elevation of the blank of Figs. 7 to 9 after it has been formed to conical shape in accordance with the teachings of my invention.

The modified apparatus of Figs. 20 to 22 can, of course, be used with the jigs of Figs. 5 and 10.

Figure 11:
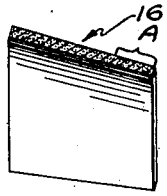
Fig. 11 is a vertical section on line 11—11 of Fig. 10.

Both modifications of apparatus may be utilized to form flat bimetallic blanks to a conical shape as shown in Figs. 10 and 11. To achieve this result the pressure by which the pressure rolls 6 and 7 are urged toward each other should be of gradually increasing amount from end to end of the rolls. This is readily achieved with the apparatus of Figs. 20 to 22 by adjusting the pressure regulating valves 158 so that the pressure applied to the diaphragm 147 of one end of the upper roll differs in amount from that at the other end. Thus, if it be desired to bend a bimetallic blank having a backing thickness of $\tfrac{1}{16}''$, a facing of $\tfrac{3}{16}''$, a width of 3¼" and an arcuate length of about 12" to a conical shape having the large radius of 5⅞" and a small radius of 5", the pressure applied to one diaphragm will be about 45 pounds per square inch and the pressure applied to the other will be about 55 pounds per square inch for pressure rolls having a diameter of about 2".

The apparatus of Figs. 16 to 19 has the two pressure cylinders interconnected and is thus not readily adapted to bend blanks to cone shape. However, it is obvious that it could be adapted for this purpose by independently connecting the cylinders with the sources of gas and air under pressure so as to permit separate adjustment of the pressure in the cylinders.

While I have illustrated a machine having two pressure rolls and two backing rolls which are power driven and in turn drive the pressure rolls, it is to be understood that other forms of apparatus may be utilized. Thus, it is possible to operate the machine with the pressure rolls removed. This can readily be accomplished by disassembling and removing the bearing blocks 92 for the pressure rolls and removing them and the rolls from the machine. Then, the backing rolls 8 and 9 can be used directly as pressure rolls. Similarly, while both rolls 8 and 9 are shown as power driven, it is obvious that only one need be so driven and that the other can be an idle roll.

This apparatus forms the subject matter of divisional application S. N. 692,064 filed August 21, 1946.

For some purposes, it may be desirable to conduct the bending operation with the blank heated to an elevated temperature. However, such procedure necessitates the provision of a protective atmosphere to prevent oxidation of the blank and is not necessary for most materials and conditions. For all practical purposes, the bending operation may be conducted with the blank at room temperature, and I have successfully bent articles having a facing thickness varying from $\tfrac{1}{64}''$ to ½".

In the above description, I have referred to the blank as having lateral and longitudinal dimensions and as being fed longitudinally between the pressure rolls or with its length disposed in the direction of movement. This has been done for purposes of illustration only, since the direction of bending is independent of the flat dimensions of the blank and is controlled solely by the direction in which successive lateral areas are progressively mechanically worked. Thus, by the term "longitudinal," I refer only to the direction of the progressive mechanical working and by the term "lateral," I refer to a direction at right angles to this. In other words, if the flat blank 1 of Figs. 1 to 3 is passed between the pressure rolls with its length parallel to the axis of the rolls, the bending will be in a plane having an axis parallel to the lengthwise center line of the blank.

The above description and examples are regarded as illustrative only in order to more clearly describe the invention and it is contemplated that there are numerous modifications and changes which may be made without departing from the spirit of the invention or the scope of the appended claims.

I claim:

1. In a method of bending a flat bimetallic article of the type having a more plastic facing bonded to a less plastic backing member to produce a curved article with the facing on its convex side and wherein the plasticity of the flat facing varies lengthwise of the article, the step of applying a substantially constant and yieldable pressure to the laterally extending areas of the facing of the flat article successively and progressively along the length of the article, the applied pressure being of an intensity predetermined to effect a lengthening of the facing requisite to produce a desired curvature of the bimetallic structure.

2. A method of bending as claimed in claim 1 in which the facing of the article bent is composed of sintered metallic material.

SAMUEL K. WELLMAN.

REFERENCES CITED

The following references are of record in the file of this patent:

UNITED STATES PATENTS

| Number | Name | Date |
| --- | --- | --- |
| 165,819 | Hahn | July 20, 1875 |
| 347,271 | Hunter | Aug. 10, 1886 |
| 415,818 | Miner | Nov. 26, 1889 |
| 926,253 | Hyde | June 29, 1909 |
| 2,056,409 | Ross | Oct. 6, 1936 |
| 2,152,611 | Swartz | Mar. 28, 1939 |
| 2,174,635 | Linderman | Oct. 3, 1939 |
| 2,190,237 | Koering | Feb. 13, 1940 |
| 2,327,706 | Halstead | Aug. 24, 1943 |
| 2,446,891 | Tower et al. | Aug. 10, 1948 |
| 2,446,892 | Lowey | Aug. 10, 1948 |

FOREIGN PATENTS

| Number | Country | Date |
| --- | --- | --- |
| 11,283 | Great Britain | of 1894 |